US011295279B2

(12) United States Patent
Fisher

(10) Patent No.: US 11,295,279 B2
(45) Date of Patent: Apr. 5, 2022

(54) SECURE SELF-MAILING FINANCIAL INSTRUMENT FOR PAYMENTS AND FUND TRANSFERS AND A METHOD FOR PROCESSING PAYMENTS AND FUND TRANSFERS MADE BY WAY OF THE SECURE SELF-MAILING FINANCIAL INSTRUMENT

(71) Applicant: Steven Fisher, Inglewood, CA (US)

(72) Inventor: Steven Fisher, Inglewood, CA (US)

( * ) Notice: Subject to any disclaimer, the term of this patent is extended or adjusted under 35 U.S.C. 154(b) by 0 days.

(21) Appl. No.: 16/260,484

(22) Filed: Jan. 29, 2019

(65) Prior Publication Data

US 2019/0362322 A1    Nov. 28, 2019

Related U.S. Application Data

(60) Provisional application No. 62/675,223, filed on May 23, 2018.

(51) Int. Cl.
| | |
|---|---|
| *G06Q 20/04* | (2012.01) |
| *G06Q 20/10* | (2012.01) |
| *B65D 27/34* | (2006.01) |
| *B65D 27/14* | (2006.01) |
| *B65D 27/30* | (2006.01) |
| *B65D 27/04* | (2006.01) |

(52) U.S. Cl.
CPC ........... *G06Q 20/042* (2013.01); *B65D 27/04* (2013.01); *B65D 27/14* (2013.01); *B65D 27/30* (2013.01); *B65D 27/34* (2013.01); *G06Q 20/102* (2013.01)

(58) Field of Classification Search
CPC ............... G06Q 20/042; G06Q 20/102; G06Q 30/0256; G06Q 30/0257; B65D 27/04; B65D 27/14; B65D 27/30; B65D 27/34; B42D 5/025
USPC ............ 229/92.1, 92.3, 92.7, 305, 314, 304; 705/40, 14.54, 14.55
See application file for complete search history.

(56) References Cited

U.S. PATENT DOCUMENTS

| | | | | |
|---|---|---|---|---|
| 3,977,597 A | * | 8/1976 | Wise ...................... | B42D 15/08 229/305 |
| 4,487,360 A | * | 12/1984 | Fisher .................... | B65D 27/06 229/304 |
| 4,602,736 A | * | 7/1986 | Barr ....................... | B65D 27/06 229/302 |
| 4,688,715 A | * | 8/1987 | Barr ....................... | B65D 27/06 229/302 |
| 4,730,768 A | * | 3/1988 | Gendron ................ | B65D 27/06 229/302 |

(Continued)

*Primary Examiner* — Christopher R Demeree
(74) *Attorney, Agent, or Firm* — Plager Schack LLP; Mark H. Plager; Stephen Hallberg

(57) ABSTRACT

A secure self-mailing financial instrument for payments/fund transfers and methods for processing are disclosed which provide a packaging mailer with a detachable securely printed financial instrument attached for the purpose of facilitating secure and convenient delivery of funds for fund transfers, payments, or purchases, including methods for assembling, opening, and preparing for shipment and for processing locally at one of a point of sale location and a website that provides a service to remotely process preparation, shipment, and delivery of the financial instrument as a mailer, as well as for remote printing, processing, folding and sealing, and tracking.

4 Claims, 7 Drawing Sheets

(56) References Cited

U.S. PATENT DOCUMENTS

| | | | | |
|---|---|---|---|---|
| 4,899,926 A | * | 2/1990 | Spaulding | B65D 27/06 229/304 |
| 5,267,687 A | * | 12/1993 | Sherman | B65D 27/06 229/305 |
| 5,803,352 A | * | 9/1998 | Spaulding | B65D 27/04 229/304 |
| 2002/0125305 A1 | * | 9/2002 | Abercrombie | B65D 27/06 229/92.1 |
| 2012/0145773 A1 | * | 6/2012 | Petkovsek | B65D 27/04 229/71 |
| 2014/0188715 A1 | * | 7/2014 | Barlok | G06Q 20/102 705/40 |
| 2019/0362322 A1 | * | 11/2019 | Fisher | B65D 27/34 |

* cited by examiner

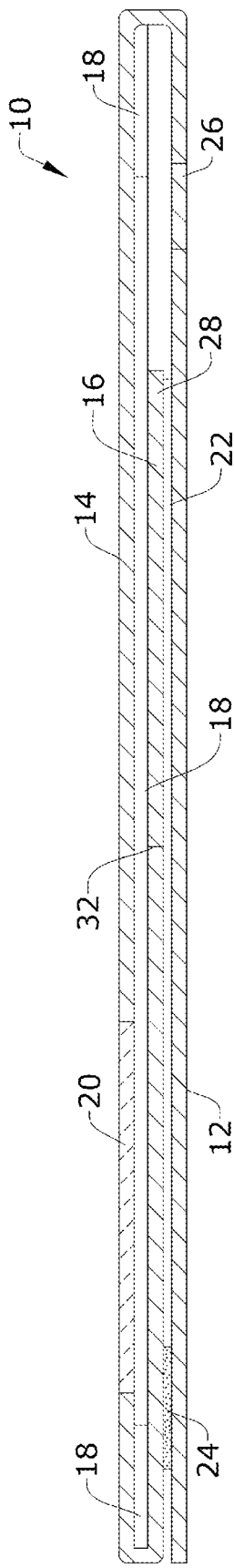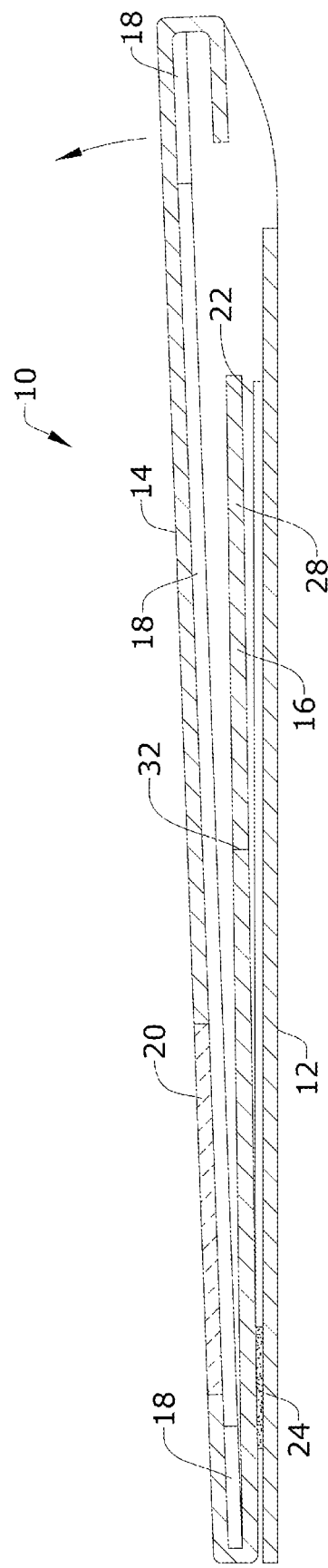
FIG.5
FIG.6

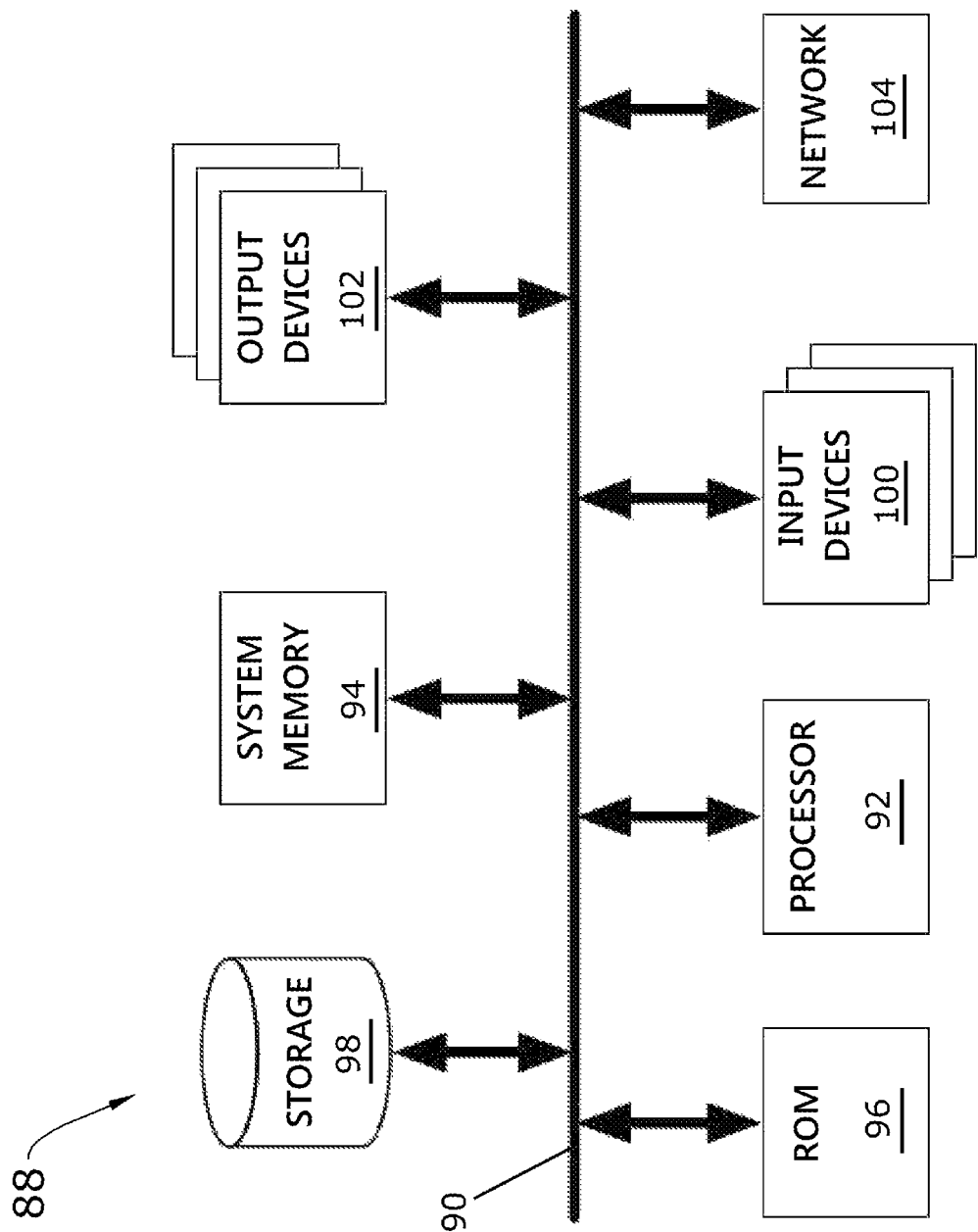

SECURE SELF-MAILING FINANCIAL INSTRUMENT FOR PAYMENTS AND FUND TRANSFERS AND A METHOD FOR PROCESSING PAYMENTS AND FUND TRANSFERS MADE BY WAY OF THE SECURE SELF-MAILING FINANCIAL INSTRUMENT

CLAIM OF BENEFIT TO PRIOR APPLICATION

This application claims benefit to U.S. Provisional Patent Application 62/675,223, entitled "A SECURE SELF-MAILING FINANCIAL INSTRUMENT FOR PAYMENTS/FUND TRANSFERS AND A METHOD FOR PROCESSING," filed May 23, 2018. The U.S. Provisional Patent Application 62/675,223 is incorporated herein by reference.

BACKGROUND

Embodiments of the invention described in this specification relate generally to retail financial services, and more particularly, to a secure self-mailing financial instrument for payments and fund transfers.

Conventional retail payment instruments such as money orders and cashier's checks have existed for hundreds of years, first developed in England in 1792 and used in the British Postal System, adopted by the United States Postal System ("USPS") in 1838. Commonly used as a means of transferring funds, making payments and purchases.

Current usage of these conventional payment instruments (also referred to as "conventional financial instruments") requires users transacting at a point of sale, typically a bank, post office, or another financial institution. This takes time and mobility to travel varying distances to such institutions. Furthermore, completion of financial transactions by way of these conventional payment instruments typically requires the purchaser to deliver the financial instrument with a specified amount to a person designated to receive the amount (hereinafter referred to as a "designee") or a person to whom to pay the amount (hereinafter referred to as a "payee"). In most cases, delivery takes place by way of mail requiring the purchase of a separate envelope, postage, and if available, insurance, and tracking services. Under the current usage of these conventional payment instruments, recovering lost financial/payment instruments or confirming receipt by the intended recipient is difficult and time consuming since remote processing and delivery of these conventional payment instruments do not exist. While the majority of the existing conventional payment instruments are purchased for delivery of payment or fund transfer, none of them to date have provided a complete integrated instrument. Therefore, anyone who purchases a conventional payment instrument needs to seek additional resources or methods of delivery to complete the cycle of the transaction.

Therefore, what is needed is a fully integrated way to print postage and track information directly on a financial instrument with a specified monetary amount for payment or fund transfer to a designee or payee which can be converted into a mailer deliverable to an address of the designee or the payee.

BRIEF DESCRIPTION

A secure self-mailing financial instrument for payments and fund transfers, methods for processing payments and fund transfers made by way of a secure self-mailing financial instrument, and a secure self-mailing financial instrument preparation, mailing, and processing system are disclosed. In some embodiments, the secure self-mailing financial instrument provides a pre-printed secure document that is connected to a financial account and is processed through a database system that provides unique identifying information that is printed directly on the document along with information including a desired monetary amount and may include the name of a designee or a payee.

In some embodiments, the secure self-mailing financial instrument supports methods of processing the self-mailing payment instrument through which an operator can process the creation of a self-mailing financial instrument at a point of sale for over the counter transactions. Furthermore, an end-user or operator of a computing device (i.e., computer, tablet, smart phone, wearable smart device, other smart computing device) with an internet connection can access a user interface (UI) connected to a cloud server or computer system capable of remotely capturing user data through a secure protocol and can transmit the captured data to a database that could then be sub-sequentially outputted to a connected printer to securely process a financial instrument remotely for remote printing, processing, folding and sealing, delivery and tracking.

In some embodiments, the specific methods for processing payments and fund transfers made by way of a secure self-mailing financial instrument include a secure self-mailing financial instrument payment and fund transfer processing method and a manual method for preparing and shipping a secure self-mailing financial instrument to transfer funds or make payment to a designee.

In some embodiments, the secure self-mailing financial instrument payment and fund transfer processing method (i) enables a secure connection between a sending user computing device and a secure self-mailing instrument payment and fund transfer cloud server, (ii) receives sending user data input of necessary information to complete a secure self-mailing financial instrument including a monetary amount, (iii) submits the necessary information provided by the sending user to a central processor at a data center to complete and print out the secure self-mailing financial instrument, (iv) processes shipment of and sending out the printed secure self-mailing financial instrument by a mail delivery service, and (v) delivers the secure self-mailing financial instrument by way of the mail delivery service to a receiving user who is one of a designee and a payee. In some embodiments, the necessary information comprises a name of the receiving user, a delivery address, a name of the sending user, a financial account number of a financial account with sufficient funds to cover the monetary amount. In some embodiments, the receiving user comprises a designee. In some embodiments, the receiving user comprises a payee.

In some embodiments, the manual method for preparing and shipping a secure self-mailing financial instrument to transfer funds or make payment to a designee includes (i) a sender going to a local shipping station, (ii) the sender filling out the necessary information for the secure self-mailing financial instrument including monetary amount, (iii) after the necessary information is filled out, processing shipment of the secure self-mailing financial instrument by a mail delivery service, and (iv) the mail deliver service delivering the secure self-mailing financial instrument to a receiver who is one of a designee and a payee.

In some embodiments, the secure self-mailing financial instrument preparation, mailing, and processing system comprises a (i) cloud server that provides a secure self-mailing financial instrument software application service (SaaS) accessible by way of a website that supports web forms which enable a sending user to specify a delivery address of a receiving user (wherein the receiving user comprises one of a designee and a payee) to receive a monetary amount as one of a fund transfer, a payment, and a purchase amount as directed in a secure self-mailing financial instrument, (ii) a central processor at a secure self-mailing financial instrument processing data center, and (iii) a mail deliver service for sending the secure self-mailing financial instrument to the delivery address of the receiving user. In some embodiments, the secure self-mailing financial instrument preparation, mailing, and processing system further comprises a sending user computing device that accesses the secure self-mailing financial instrument software application service by connection to the website to allow the sending user to fill out necessary information in the secure self-mailing financial instrument to provide the monetary amount as one of a fund transfer, a payment, and a purchase amount to the receiving user. In some embodiments, the secure self-mailing financial instrument preparation, mailing, and processing system further comprises a local shipping station to which the sending user goes to fill out necessary information in the secure self-mailing financial instrument to provide the monetary amount as one of a fund transfer, a payment, and a purchase amount to the receiving user.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein:

FIG. 5 conceptually illustrates a section view taken along line 5-5 of the secure self-mailing financial instrument when folded into a sealed mailer in some embodiments.

FIG. 6 conceptually illustrates a section view of the secure self-mailing financial instrument during usage as a sealed mailer in some embodiments.

FIG. 10 conceptually illustrates an electronic system with which some embodiments of the invention are implemented.

DETAILED DESCRIPTION

Figure 1:
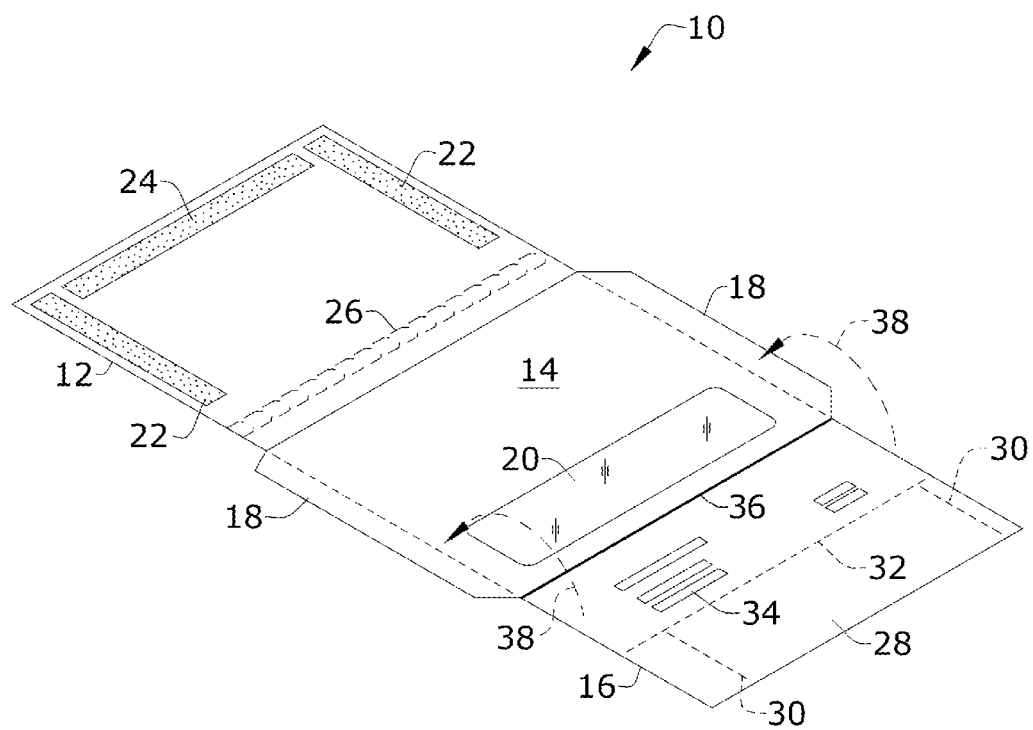
FIG. 1 conceptually illustrates a perspective view of a secure self-mailing financial instrument in some embodiments with a first folding crease along which a central flap folds over an upper flap resulting in a first folded combination.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a secure self-mailing financial instrument for payments and fund transfers, methods for processing payments and fund transfers made by way of a secure self-mailing financial instrument, and a secure self-mailing financial instrument preparation, mailing, and processing system. In some embodiments, the secure self-mailing financial instrument provides a pre-printed secure document that is connected to a financial account and is processed through a database system that provides unique identifying information that is printed directly on the document along with information including a desired monetary amount and may include the name of a designee or a payee.

As stated above, conventional retail payment instruments, such as money orders and cashier's checks, have existed for hundreds of years, first developed in England in 1792 and used in the BPS, adopted by the USPS in 1838. Since then, conventional retail payment instruments have commonly used as a means of transferring funds, making payments and purchases. Current usage of these conventional payment/financial instruments requires users transacting at a point of sale, typically a bank, post office, or another financial institution, which takes time and requires some manner of physical travel mobility of a purchaser of a retail payment instrument. A way to deliver the retail payment instrument retail payment instrument to the recipient must also be planned, which typically involves delivery by mail. To complete delivery of the retail payment instrument, the purchaser is therefore required to have or to purchase a separate envelope, postage, and if available, insurance, and tracking services. Recovering lost financial/payment instruments or confirming receipt by the intended recipient is difficult and time consuming since remote processing and delivery of conventional payment instruments is non-existent.

Embodiments of the secure self-mailing financial instrument for payments and fund transfers described in this specification solve such problems by a packaging design that integrates the payment instrument with methods of processing and delivering the payment instrument, along with facilitating the integration of secure processes such as, but not limited to, tracking delivery, receipt notification, etc. The design of the secure self-mailing financial instrument is supportive of methods for digitally and remotely processing payments and fund transfers, thereby bridging conventional and digital processes for local and remote processing for on location or remote processing and mailing of a secure payment instrument.

Embodiments of the secure self-mailing financial instrument for payments and fund transfers and method for processing payments and fund transfers made by way of a secure self-mailing financial instrument described in this specification differ from and improve upon currently existing options. In particular, some embodiments differ by providing ways for printing postage and tracking information directly onto a financial instrument designed according to a particular specification that allows it to then be converted into a mailer. There is currently no other retail financial instrument that integrates the payment instrument with the mailer.

In addition, some embodiments of the secure self-mailing financial instrument for payments and fund transfers and method for processing payments and fund transfers made by way of a secure self-mailing financial instrument improve upon the currently existing options by reducing the complexity of making payment and transferring funds by combining the financial instrument and the delivery mechanism into a single item. Specifically, the conventional way to make payments and transfer funds typically require multiple steps that create redundancy in the process of designating a payee or recipient of funds or payment. Furthermore, the existing conventional methods neither include a way of tracking and securing delivery nor a method for remote processing and delivery. By contrast, the secure self-mailing financial instrument for payments and fund transfers and method for processing payments and fund transfers made by way of a secure self-mailing financial instrument of the present disclosure improves on the conventional mechanisms and practices by providing a way to print postage and track information directly on a financial instrument designed to a particular specification that allows it to then be converted into a mailer.

In some embodiments, the secure self-mailing financial instrument supports methods of processing the self-mailing payment instrument through which an operator can process the creation of a self-mailing financial instrument at a point of sale for over the counter transactions. Furthermore, an end-user or operator of a computing device (i.e., computer, tablet, smart phone, wearable smart device, other smart computing device) with an internet connection can access a user interface (UI) connected to a cloud server or computer system capable of remotely capturing user data through a secure protocol and can transmit the captured data to a database that could then be sub-sequentially outputted to a connected printer to securely process a financial instrument remotely for remote printing, processing, folding and sealing, delivery and tracking.

Several more detailed embodiments are described by reference to Figures in the sections below. Section I describes a secure self-mailing financial instrument by reference to FIGS. 1-6. Section II describes some methods for processing payments and fund transfers made by way of a secure self-mailing financial instrument by reference to FIGS. 7-8. Section III describes a secure self-mailing financial instrument preparation, mailing, and processing system by reference to FIG. 9. Section IV describes an electronic system by reference to FIG. 10 which implements one or more aspects of the methods for processing payments and fund transfers made by way of a secure self-mailing financial instrument and the secure self-mailing financial instrument preparation, mailing, and processing system.

I. Secure Self-Mailing Financial Instrument

The secure self-mailing financial instrument for payments and fund transfers of the present disclosure may be comprised of the following elements. This list of possible constituent elements is intended to be exemplary only and it is not intended that this list be used to limit the secure self-mailing financial instrument for payments and fund transfers of the present application to just these elements. Persons having ordinary skill in the art relevant to the present disclosure may understand there to be equivalent elements that may be substituted within the present disclosure without changing the essential function or operation of the secure self-mailing financial instrument for payments and fund transfers. Specifically, the secure self-mailing financial instrument for payments and fund transfers of some embodiments comprises a lower flap, an upper flap, a central flap, side closure flaps, a user information viewing window, side adhesive strips, an end adhesive strip, a perforated opening strip, a document, a document side perforation, a longitudinal document perforation, and user information.

By way of example, FIGS. 1-6 conceptually illustrate different aspects and views of a secure self-mailing financial instrument 10. Turning first to FIG. 1, a perspective view of the secure self-mailing financial instrument 10 is conceptually illustrated with a first folding crease 36 along which a central flap 16 folds over 38 an upper flap 14 resulting in a first folded combination. As shown in this figure, the secure self-mailing financial instrument 10 includes a lower flap 12, the upper flap 14, the central flap 16, side closure flaps 18, a user information viewing window 20, side adhesive strips 22, an end adhesive strip 24, a perforated opening strip 26, a document 28, a pair of document side perforations 30, a longitudinal document perforation 32, user information 34, and the first folding crease 36.

The secure self-mailing financial instrument 10 is shown in this figure in a first aspect as a blank packaging mailer with a section of the central flap 16 for user information 34. The central flap 16 also includes the longitudinal document perforation 32 and the pair of document side perforations 30 which segment the detachable document 28 portion of the financial instrument. When the central flap 16 folds over 38 the upper flap 14 to form the first folded combination, the side closure flaps 18 remain segmented until folded over and pasted to enclose the sides, which is described below by reference to FIG. 2.

The upper flap 14 includes a pair of side closure flaps 18 and the user information viewing window 20. In this way, when the central flap 16 folds over 38 the upper flap 14, the user information 34 is visible through the user information viewing window 20.

The lower flap 12 includes the side adhesive strips 22, the end adhesive strip 24, and the perforated opening strip 26. While not shown in this figure, the lower flap 12 folds over the first folded combination of the upper flap 14 and central flap 16 to enclose and seal the secure self-mailing financial instrument 10.

Figure 2:
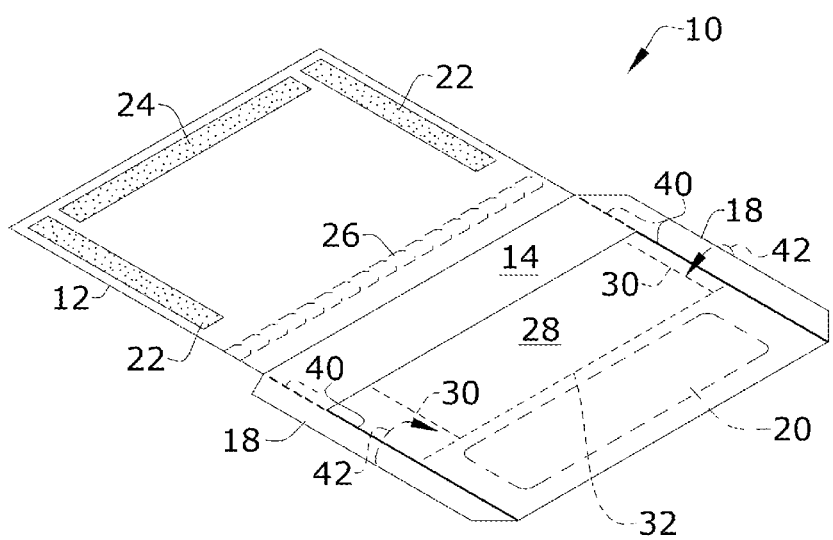
FIG. 2 conceptually illustrates a perspective view of the secure self-mailing financial instrument in some embodiments with a pair of second folding creases along which a pair of side closure flaps fold over the first folded combination of the central flap and the upper flap resulting in a second folded combination.

Now turning to FIG. 2, a perspective view of a second aspect of the secure self-mailing financial instrument 10 is conceptually illustrated with a pair of second folding creases 40 along which the pair of side closure flaps 18 fold over 42 and paste to the first folded combination of the central flap 16 and the upper flap 14, resulting in a second folded combination.

As shown in this figure, further folding and sealing of the secure self-mailing financial instrument 10 along the sides of the mailer is demonstrated with the detachable document 28 and other sections segmented by perforation lines 30 and 32 visible over the upper flap 14 and the user information viewing window 20 shown in dashed lines (not actually visible from this view, but present and visible from underneath the secure self-mailing financial instrument 10). The pair of side closure flaps 18 are pasted to the sides of part of the upper flap 14 and to the sides of the central flap 16 when folded over 42 pair of second folding creases 40, thereby securing the enclosed document 28 with financial information specified, while allowing delivery information to appear through the user information viewing window 20.

Figure 3:
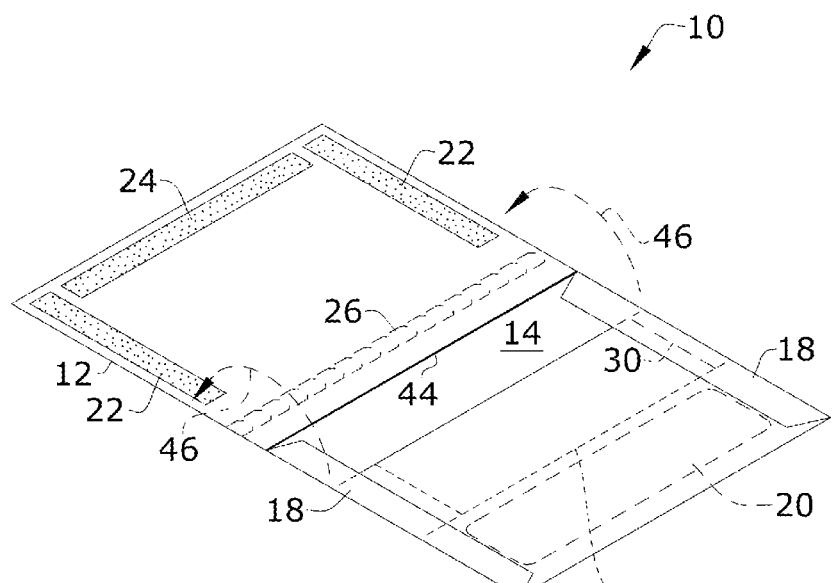
FIG. 3 conceptually illustrates a perspective view of the secure self-mailing financial instrument in some embodiments with a third folding crease along which the second folded combination of the side closure flaps, the central flap, and the upper flap folds over a lower flap resulting in a sealed mailer.

By way of example, FIG. 3 conceptually illustrates a perspective view of a third aspect of the secure self-mailing financial instrument 10 with a third folding crease 44 along which the second folded combination of the side closure flaps 18, the central flap 16, and the upper flap 14 folds over 46 the lower flap 12, resulting in a sealed mailer. The sealed mailer can thereafter be opened via the perforated opening strip 26, which appears at the back side of the sealed mailer.

Figure 4:
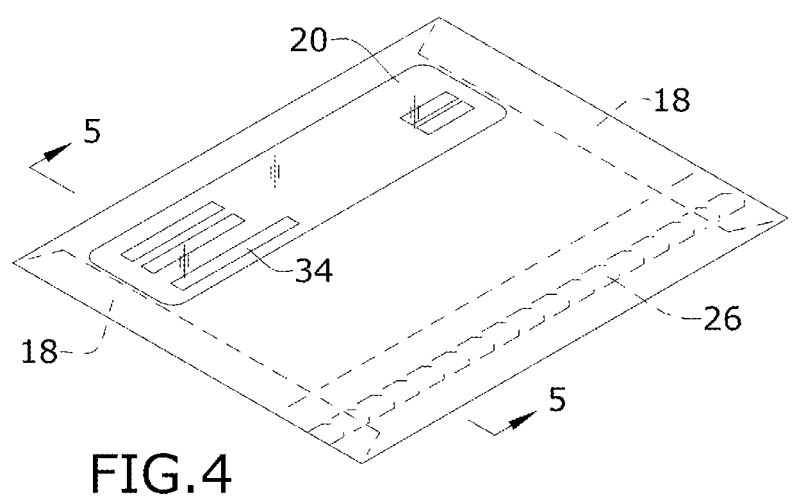
FIG. 4 conceptually illustrates the sealed mailer from a perspective view of the secure self-mailing financial instrument in some embodiments.

The front side of the sealed mailer is shown in FIG. 4. Specifically, FIG. 4 conceptually illustrates a perspective front side view of the sealed mailer as a fourth aspect of the secure self-mailing financial instrument 10 along with line 5-5, which relates to another view described below by reference to FIGS. 5-6. Nevertheless, as shown in FIG. 4, the user information 34 is visible through the user information viewing window 20 of the secure self-mailing financial instrument 10. In some embodiments, the necessary information for the secure self-mailing instrument 10 includes the user information 34 and other necessary information pertaining to a fund transfer or payment amount, which is not visible through the user information viewing window 20 but is printed on the detachable document 28 portion of the sealed mailer to ensure privacy of financial transactions. In some embodiments, the necessary information comprises a name of a receiving user, a delivery address, a name of a sending user, a financial account number of a financial accounts with sufficient funds to cover the monetary amount. In some embodiments, the receiving user comprises a designee. In some embodiments, the receiving user comprises a payee.

Now turning to a fifth aspect, FIG. 5 conceptually illustrates a section view taken along line 5-5 of the secure self-mailing financial instrument 10 when folded into the sealed mailer. As shown in this figure, the fifth aspect demonstrates how the lower flap 12, the central flap 16, and the upper flap 14 are folded, the side closure flaps 18 are pasted to secure the upper flap 14 to the central flap 16, and the side adhesive strips 22 and the end adhesive strip 24 secure the lower flap 12 to the central flap 16, and thereby form the sealed mailer.

In a sixth aspect that is similar to the fifth aspect, FIG. 6 conceptually illustrates a section view of the secure self-mailing financial instrument 10 during usage as a sealed mailer where the upper flap 14 is being pulled up and away from the lower flap 12 after the perforated opening strip 26 is pulled open to unseal the sealed mailer, thereby allowing the receiving user (designee or payee) to access the printed financial information on the document 28 portion of the secure self-mailing financial instrument 10. Also, the document 28 portion includes at least some of the necessary information critical for completing a transaction for transferring funds or making a payment to a designee or payee, and therefore should remain undamaged. Even when the designee or payee opens the perforated opening strip 26 and separates the lower flap 12 from the upper flap 14, the document 28 portion remains unscathed because of the other sections that are pasted (or stick) to the side adhesive strips 22 and the end adhesive strip 24 such that the document 28 is segmented off from the other sections by perforation lines 30 and 32.

The various elements and different aspects of the secure self-mailing financial instrument for payments and fund transfers may be related in the following exemplary fashion. It is not intended to limit the scope or nature of the relationships between the various elements and the following examples are presented as illustrative examples only. Notably, the secure self-mailing financial instrument is based on construction of a blank packaging mailer that may include one fold line and one perforated line and a way to seal it into a deliverable mailer. The relationship between these elements would allow for folding, sealing of the packaging mailer, and the detaching of the payment instrument on the document portion 28. As demonstrated in FIGS. 1-3, a diagram or die-line, for example, may detail the specific location and number of fold and perforated lines and the recommended manner of sealing the packaging mailer. Another facet would be to include a detachable document 28 which is essentially a detachable frame which remains undamaged throughout the process of folding, delivering, and opening the secure self-mailing financial instrument 10. The framed document 28, while detachable by the designee or payee, is also capable of secondary processing by other operators involved in the preparation, delivery, or opening/cashing out of the secure self-mailing financial instrument 10.

In some embodiments, security features and other elements or information for tracking and final processing are printed or otherwise included in the secure self-mailing financial instrument 10. Another element is the secondary printing of specific data onto the document 28 section and in the user information 34 section of the secure self-mailing financial instrument 10 as described above. In the this way, the secure self-mailing financial instrument 10 is able to be processed by automatic mechanical devices, such as a sheet-fed scanner and is able to complete preparation by a printer which may support rectangular media.

To use the secure self-mailing financial instrument for payments and fund transfers and method for processing payments and fund transfers made by way of a secure self-mailing financial instrument of the present disclosure, users typically complete a transaction at a point of sale, such as a bank, post office, or other financial institution. This service would provide the end-user with a pre-printed secure document connected to a bank account and processed through a database system that provides unique identifying information which would be printed directly on the document along with the purchaser's information including, the desired dollar amount and may include the designee or payees name.

Completion of these financial transactions would require the purchaser deliver the financial instrument to the designee or payee in most cases this delivery takes place by way of mail requiring the purchase of a separate envelope, postage and if available, insurance and tracking services. Under the current method, the process of recovering lost instruments or confirming receipt by the intended recipient is difficult and time consuming, remote processing and delivery of these payment instruments are non-existing.

II. Methods for Processing Payments and Fund Transfers made by Way of a Secure Self-Mailing Financial Instrument In some embodiments, the methods for processing payments and fund transfers made by way of a secure self-mailing financial instrument include a secure self-mailing financial instrument payment and fund transfer processing method and a manual method for preparing and shipping a secure self-mailing financial instrument to transfer funds or make payment to a receiver.

In some embodiments, the secure self-mailing financial instrument payment and fund transfer processing method includes a plurality of steps comprising (i) enabling a secure connection between a sending user computing device and a secure self-mailing instrument payment and fund transfer cloud server in response to the sending user computing device accessing and a sending user logging into a website hosted by the secure self-mailing instrument payment and fund transfer cloud server, (ii) receiving necessary information as input by the sending user to complete a secure self-mailing financial instrument, (iii) submitting the necessary information provided by the sending user to a central processor at a data center to complete and print out the secure self-mailing financial instrument, (iv) processing shipment of and sending out the printed secure self-mailing financial instrument by a mail delivery service, and (v) delivering the secure self-mailing financial instrument by way of the mail delivery service to a receiving user who is one of a designee and a payee.

In some embodiments, the secure self-mailing instrument payment and fund transfer cloud server hosts a website for a secure self-mailing financial instrument preparation, mailing, and processing application service (SaaS). In some embodiments, the website supports and enables web forms as a way to receive input from the sender user. In some embodiments, the necessary information includes at least a payee and an amount as requested by the web forms. In some embodiments, the secure self-mailing financial instrument includes at least one of a fund transfer, a payment, and a purchase amount.

Figure 7:
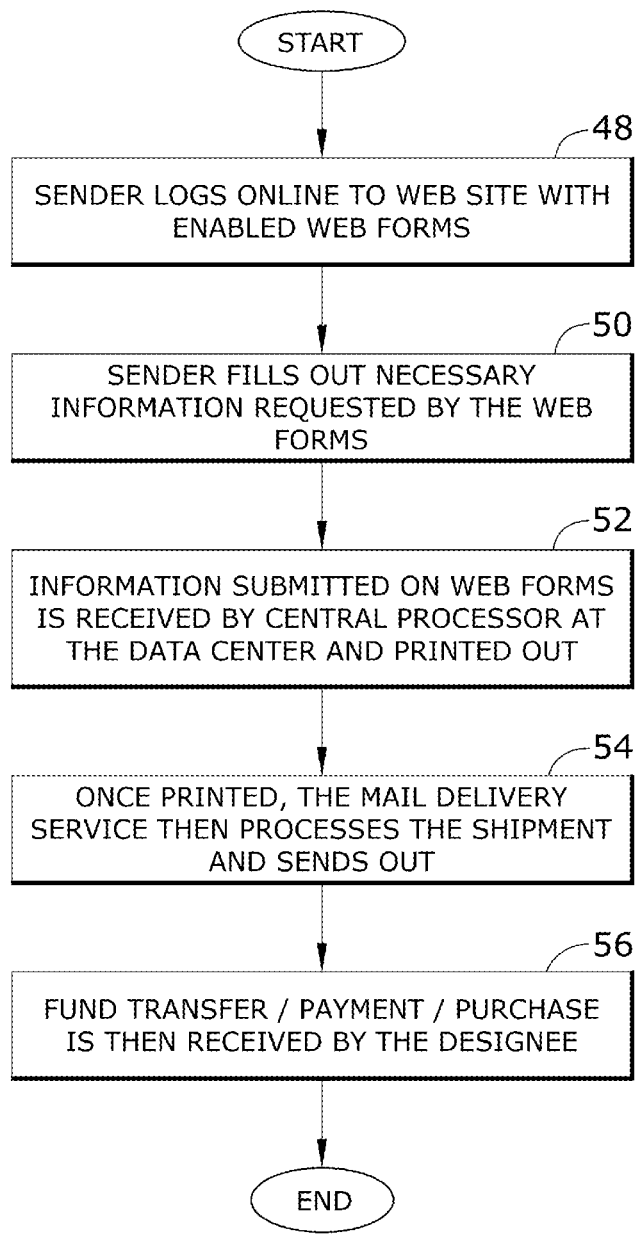
FIG. 7 conceptually illustrates a secure self-mailing financial instrument payment and fund transfer processing method in some embodiments.

By way of example, FIG. 7 conceptually illustrates a secure self-mailing financial instrument payment and fund transfer processing method. As shown in this figure, the secure self-mailing financial instrument payment and fund transfer processing method starts when a sending user (or "sender") logs in online at a web forms-enabled website (at 48) of the secure self-mailing financial instrument preparation, mailing, and processing SaaS service provided by the secure self-mailing instrument payment and fund transfer cloud server with enabled web forms. The secure self-mailing financial instrument payment and fund transfer processing method continues with the sender filling out necessary information as requested by the web forms (at 50). When the information provided by the sender is submitted, the secure self-mailing financial instrument payment and fund transfer processing method then continues to the next step of receiving the necessary information (at 52).

In some embodiments, the necessary information comprises a name of a receiving user (as a designee or a payee), a delivery address to which the secure self-mailing financial instrument is to be sent (by a delivery service, such as the local mail delivery service), sender's name, a financial account number of a financial account of sender with sufficient funds to cover the monetary amount.

In some embodiments, the necessary information is received at a central processor at a data center, such as by the secure self-mailing instrument payment and fund transfer cloud server. The central processor then prints the necessary information onto the secure self-mailing financial instrument (at 52). After printing, the secure self-mailing financial instrument payment and fund transfer processing method then has a mail delivery service to process shipment of the secure self-mailing financial instrument and send it out (at 54) to a destination address associated with a designee or payee. Once delivered, the secure self-mailing financial instrument (at 56) with the fund transfer, payment, or purchase amount available for the designee or payee. Then the secure self-mailing financial instrument payment and fund transfer processing method ends.

Although the example above demonstrates a method for preparing and delivering a single secure self-mailing financial instrument, in some instances, the secure self-mailing financial instrument payment and fund transfer processing method processes multiple secure self-mailing financial instruments, and the multiple secure self-mailing financial instruments may be associated with a single sending user or with several different sending users, and may be delivered to a single designee or payee or several different receiving users.

While the secure self-mailing financial instrument payment and fund transfer processing method includes several automated steps in the preparation, printing, and delivery of the secure self-mailing financial instrument, a similar manual method can be performed as an alternative to the more computer-based and machine-based automated method. In particular, the manual method for preparing and shipping a secure self-mailing financial instrument to transfer funds or make payment to a designee of some embodiments includes a plurality of steps comprising (i) a sender going to a local shipping station, (ii) the sender filling out necessary information for the secure self-mailing financial instrument as requested by personnel at the shipping station facility, (iii) after the necessary information is filled out, processing shipment of the secure self-mailing financial instrument by a mail delivery service, and (iv) the mail deliver service delivering the secure self-mailing financial instrument with at least one of a fund transfer, a payment, and a purchase amount to a receiving user who is one of a designee and a payee.

Figure 8:
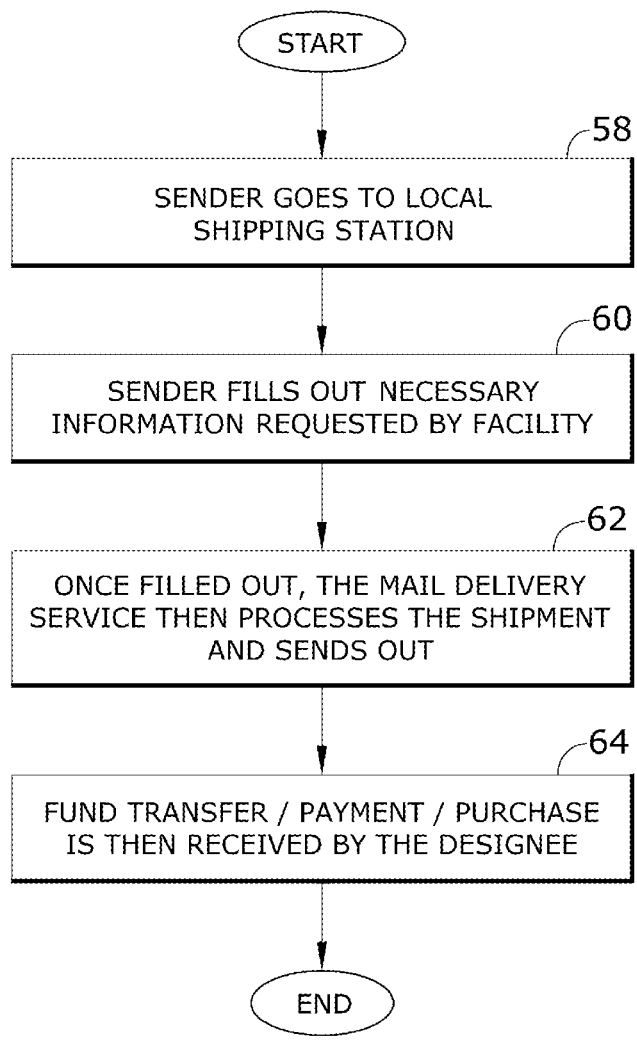
FIG. 8 conceptually illustrates a manual method for preparing and shipping a secure self-mailing financial instrument to transfer funds or make payment to a designee in some embodiments.

By way of example, FIG. 8 conceptually illustrates a manual method for preparing and shipping a secure self-mailing financial instrument to transfer funds or make payment to a designee. As shown in this figure, the manual method for preparing and shipping a secure self-mailing financial instrument starts when a sending user ("sender") goes to a local shipping station (at 58). An example of a local shipping station is described below by reference to FIG. 9. The manual method for preparing and shipping a secure self-mailing financial instrument then continues with the sender filling out the necessary information as requested by a representative or personnel at the shipping station (at 60). In some embodiments, the sender completes the necessary information with one or more of the name of a designee or a payee receiving either a fund transfer, a payment amount, or a purchase amount, a destination delivery address associated with the designee or the payee, the sender's name, a financial account number of a financial account (associated with the sender) with sufficient funds to cover the monetary amount. Once the sender has completed filling out the necessary information, then the manual method for preparing and shipping a secure self-mailing financial instrument includes a mail delivery service (at 62) processing the secure self-mailing financial instrument for shipment and continues ahead to shipping the secure self-mailing financial instrument. Finally, after the mail deliver service delivers the secure self-mailing financial instrument, a designee or a payee is able to access the monetary amount specified in the fund transfer, the payment, or the purchase amount. Then the manual method for preparing and shipping a secure self-mailing financial instrument ends.

III. Secure Self-Mailing Financial Instrument Creation and Processing System

The secure self-mailing financial instrument for payments and fund transfers and method for processing payments and fund transfers made by way of a secure self-mailing financial instrument of the present disclosure generally works by an innovative design and as a novel product, the combination of design and product thereby producing a secure self-mailing financial instrument that is an improvement in retail financial service for payments/fund transfers, such as self-mailing money order or self-mailing cashier check. A new packaging design that allows a user to print on, cut, crease, fold, and perforate paper to a unique specification that would allow the folding and gluing of this product to produce a unique mailer along with the methods for folding, sealing, and opening the mailer, a detachable payment instrument, a detachable customer receipt, a window cut-out for mailing and viewing the addressees, the postage paid, and other unique identifiers.

More specifically, this invention includes the option of the utilization of either a smart device or a stand-alone computer for remote processing of a financial instrument for payments or fund transfers from any location where the user can access the internet. Alternately an agent or a clerk at a financial institution or retail financial services provider utilizing a networked computer configured with a point-of-sale system can process over the counter retail sales of these payment instruments. Another option would be for a financial institution or retail financial services provider could provide a kiosk for on location self-service processing and purchasing of a self-mailing financial instrument. In each instance an end-user connected to a system either locally or remotely can input information such as dollar amounts, fees, postage, tracking information, user inputs and other unique identifying information which would then be printed directly on a pre-formatted secured document that could then be folded and sealed. The creation of this product combined with specific methods of processing would results in a method of producing a secure self-mailing financial instrument such as a self-mailing money order or a self-mailing cashier's check. Usages of this self-mailing financial instrument would serve as a financial service and sold directly or remotely as a retail payment instrument for the purposes of the end-user including making payments, purchases, and transferring funds to other individuals or businesses.

In some embodiments, the secure self-mailing financial instrument preparation, mailing, and processing system comprises a (i) cloud server that provides a secure self-mailing financial instrument software application service (SaaS) accessible by way of a website that supports web forms which enable a sending user to specify a delivery address of a receiving user (wherein the receiving user comprises one of a designee and a payee) to receive a monetary amount as one of a fund transfer, a payment, and a purchase amount as directed in a secure self-mailing financial instrument, (ii) a central processor at a secure self-mailing financial instrument processing data center, and (iii) a mail deliver service for sending the secure self-mailing financial instrument to the delivery address of the receiving user. In some embodiments, the secure self-mailing financial instrument preparation, mailing, and processing system further comprises a sending user computing device that accesses the secure self-mailing financial instrument software application service by connection to the website to allow the sending user to fill out necessary information in the secure self-mailing financial instrument to provide the monetary amount as one of a fund transfer, a payment, and a purchase amount to the receiving user. In some embodiments, the secure self-mailing financial instrument preparation, mailing, and processing system further comprises a local shipping station to which the sending user goes to fill out necessary information in the secure self-mailing financial instrument to provide the monetary amount as one of a fund transfer, a payment, and a purchase amount to the receiving user.

Figure 9:
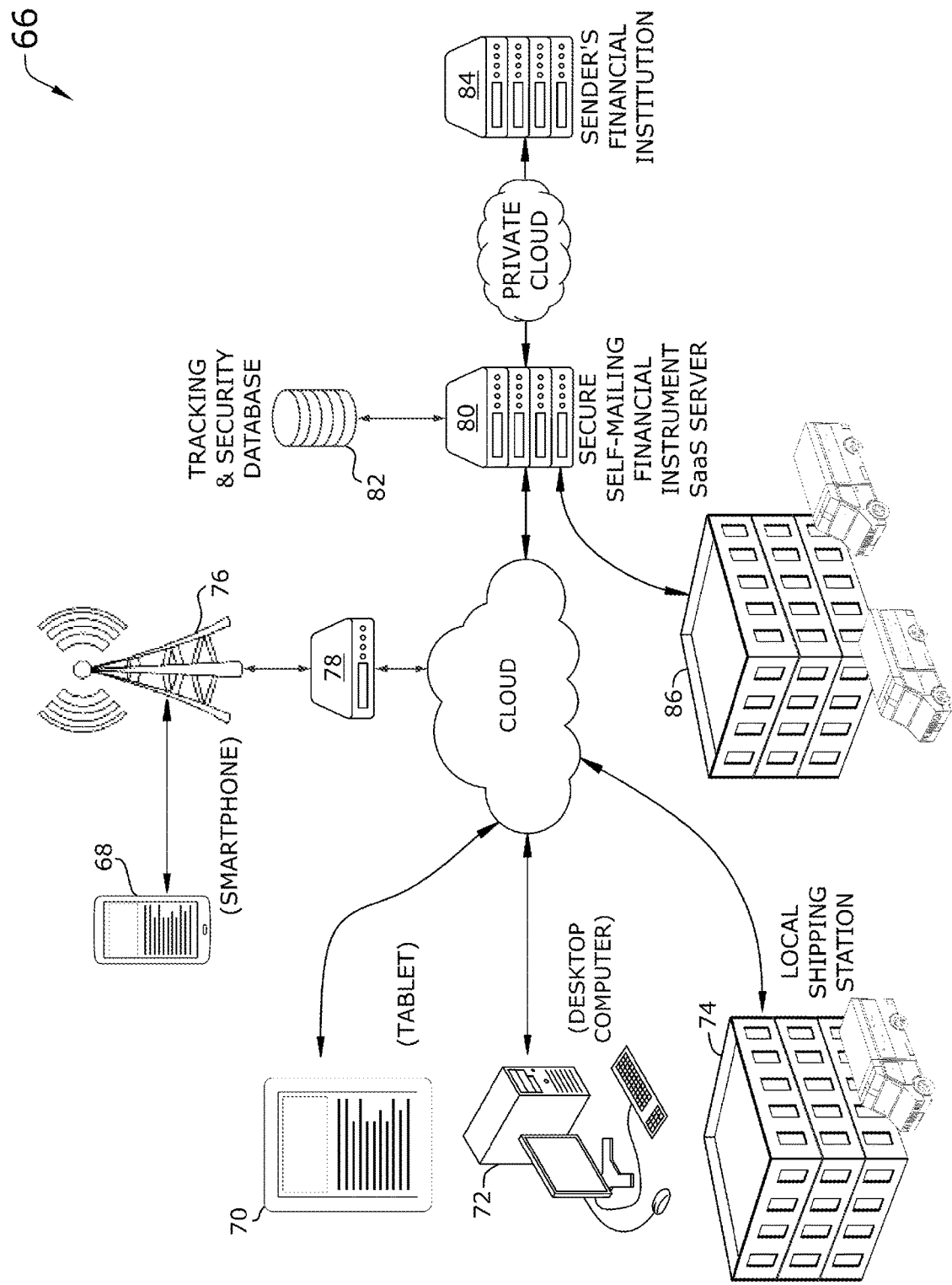
FIG. 9 conceptually illustrates a cloud-network architecture of a secure self-mailing financial instrument preparation, mailing, and processing system in some embodiments.

By way of example, FIG. 9 conceptually illustrates a cloud-network architecture of a secure self-mailing financial instrument preparation, mailing, and processing system 66. As shown in this figure, the secure self-mailing financial instrument preparation, mailing, and processing system 66 includes several sending user computing devices, such as a smartphone 68, a tablet computing device 70, and a desktop computer 72. The sending user can use any or all of these computing devices to access a secure self-mailing financial instrument cloud SaaS service so as to prepare a fund transfer or payment amount in a secure self-mailing financial instrument for delivery to a designee or a payee. The secure self-mailing financial instrument preparation, mailing, and processing system 66 also includes a local shipping station 74. In some embodiments, the local shipping station 74 can be a point of sale station, such as might be found in a convenience store, a mail center, a bank, a financial institution, or any other business establishment.

The secure self-mailing financial instrument preparation, mailing, and processing system 66 also includes a secure self-mailing financial instrument SaaS server 80 that hosts a website and provides the secure self-mailing financial instrument cloud SaaS service. Thus, while the sending user generally uses only one of the computing devices or physically goes to the local shipping station 74, each of the computing devices (smartphone 68, tablet computing device 70, and desktop computer 72) and one or more computing devices at the local shipping station 74 connect in one manner or another over the internet to the secure self-mailing financial instrument SaaS server 80 to access the secure self-mailing financial instrument cloud SaaS service. In this example, the smartphone 68 connects to a wireless communication tower 76 and accesses the secure self-mailing financial instrument cloud SaaS service provided by the secure self-mailing financial instrument SaaS server 80 via a gateway access device 78. Also shown in this example, the tablet computing device 70, the desktop computer 72, and any computing devices in the local shipping station 74 access the secure self-mailing financial instrument cloud SaaS service provided by the secure self-mailing financial instrument SaaS server 80 by direct internet connection over the cloud. The connections shown in this figure are not intended to be limiting as a person skilled in the relevant art would appreciate the many different manners in which computing devices are able to connect to cloud servers in wired or wireless fashion.

The secure self-mailing financial instrument preparation, mailing, and processing system 66 also includes a tracking and security database 82 that is communicably connected to the secure self-mailing financial instrument SaaS server 80 and allows the sending user to obtain tracking services, security services, etc., in relation to the secure self-mailing financial instrument.

Additionally, the secure self-mailing financial instrument preparation, mailing, and processing system 66 in this figure shows a financial institution 84 of the sending user and a delivery service 86. Note that the financial institution 84 of the sending user and the delivery service 86 are typically separate entities that are used in connection with the secure self-mailing financial instrument preparation, mailing, and processing system 66. The financial institution 84 is accessed over a private cloud connection by the secure self-mailing financial instrument SaaS server 80. The private cloud connection is encrypted for privacy and data security, and the connection is made in some embodiments to validate the presence of existing sufficient funds to cover the specified monetary amount of the secure self-mailing financial instrument before final processing and delivery to the recipient. In a typical scenario, the secure self-mailing financial instrument is mailed via USPS. However, the delivery service 86 may be the USPS, a private mail and/or package delivery service, or another service to deliver the secure self-mailing financial instrument to the designee or the payee. Therefore, the delivery service 86 shown in this example may be considered any type of delivery service.

The above-described embodiments of the invention are presented for purposes of illustration and not of limitation.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the terms "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 10 conceptually illustrates an electronic system 88 with which some embodiments of the invention are implemented. The electronic system 88 may be a computer, mobile device, tablet, phone, PDA, or any other sort of electronic device. Such an electronic system includes various types of computer readable media and interfaces for various other types of computer readable media. Electronic system 88 includes a bus 90, processing unit(s) 92, a system memory 94, a read-only 96, a permanent storage device 98, input devices 100, output devices 102, and a network 104.

The bus 90 collectively represents all system, peripheral, and chipset buses that communicatively connect the numerous internal devices of the electronic system 88. For instance, the bus 90 communicatively connects the processing unit(s) 92 with the read-only 96, the system memory 94, and the permanent storage device 98.

From these various memory units, the processing unit(s) 92 retrieves instructions to execute and data to process in order to execute the processes of the invention. The processing unit(s) may be a single processor or a multi-core processor in different embodiments.

The read-only-memory (ROM) 96 stores static data and instructions that are needed by the processing unit(s) 92 and other modules of the electronic system. The permanent storage device 98, on the other hand, is a read-and-write memory device. This device is a non-volatile memory unit that stores instructions and data even when the electronic system 88 is off. Some embodiments of the invention use a mass-storage device (such as a magnetic or optical disk and its corresponding disk drive) as the permanent storage device 98.

Other embodiments use a removable storage device (such as a floppy disk or a flash drive) as the permanent storage device 98. Like the permanent storage device 98, the system memory 94 is a read-and-write memory device. However, unlike storage device 98, the system memory 94 is a volatile read-and-write memory, such as a random access memory. The system memory 94 stores some of the instructions and data that the processor needs at runtime. In some embodiments, the invention's processes are stored in the system memory 94, the permanent storage device 98, and/or the read-only 96. For example, the various memory units include instructions for processing appearance alterations of displayable characters in accordance with some embodiments. From these various memory units, the processing unit(s) 92 retrieves instructions to execute and data to process in order to execute the processes of some embodiments.

The bus 90 also connects to the input and output devices 100 and 102. The input devices enable the user to communicate information and select commands to the electronic system. The input devices 100 include alphanumeric keyboards and pointing devices (also called "cursor control devices"). The output devices 102 display images generated by the electronic system 88. The output devices 102 include printers and display devices, such as cathode ray tubes (CRT) or liquid crystal displays (LCD). Some embodiments include devices such as a touchscreen that functions as both input and output devices.

Finally, as shown in FIG. 10, bus 90 also couples electronic system 88 to a network 104 through a network adapter (not shown). In this manner, the computer can be a part of a network of computers (such as a local area network ("LAN"), a wide area network ("WAN"), or an intranet), or a network of networks (such as the Internet). Any or all components of electronic system 88 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 7-8 conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a program which, when executed by a processor of a computing device, provides a secure self-mailing financial instrument payment and fund transfer processing service for creation of a secure self-mailing financial instrument, said program comprising sets of instructions for:

enabling a secure connection between a sending user computing device and a secure self-mailing instrument payment and fund transfer cloud server in response to the sending user computing device accessing and a sending user logging into a website hosted by the secure self-mailing instrument payment and fund transfer cloud server, wherein logging into the website by the sending user starts a process for preparing a secure self-mailing financial instrument for transfer of funds payable to a receiving user, wherein the website comprises a user interface (UI) through which the sending user inputs required information to complete the process for preparing the secure a self-mailing financial instrument for remote printing, processing, folding and sealing, delivering to the receiving user, and tracking, wherein the secure self-mailing financial instrument has a specific configuration for printing and for inclusion of the required information input by the sending user, wherein the specific configuration of the secure self-mailing financial instrument includes an upper flap, a central flap that is configured to fold over the upper flap in a first folded configuration, a lower flap that is configured to fold over the central flap and the upper flap in a second folded configuration, a pair of side closure flaps disposed along a pair of perforated creases adjacent to opposing edges of the upper flap, a user information viewing window disposed in a lower section of the upper flap, a delivery information section of the central flap, a pair of side strips disposed along an inner surface of the lower flap, an end strip disposed along an upper edge of the inner surface of the lower flap and configured to adhere to the upper flap in a second folded configuration, a document section of the upper flap, a pair of document side perforations, and a perforated opening strip disposed along a lower section of the lower flap;

receiving sending user information input into the UI of the website by the sending user from the sending user computing device, wherein the sending user information includes a name of the sending user and a return address of the sending user;

receiving delivery information input into the UI of the website by the sending user from the sending user computing device, wherein the delivery information includes details needed to deliver the secure self-mailing financial instrument to a destination associated with the receiving user;

receiving a selection, in the UI of the website by the sending user from the sending user computing device, of a specific financial instrument from a plurality of financial instrument types shown for selection in the UI of the website, wherein the plurality of financial instrument types comprise a funds transfer financial instrument, a payment to a designee financial instrument, and a payment to a payee financial instrument;

receiving a monetary amount input into the UI of the web site by the sending user from the sending user computing device, wherein the monetary amount includes an amount of money payable to the receiving user;

receiving financial account information input into the UI of the web site by the sending user from the sending user computing device, wherein the financial account information includes a specific financial account number of a financial account established at a financial institution and associated with the sending user;

determining, by way of a private encrypted cloud connection between the secure self-mailing instrument payment and fund transfer cloud server and a server of the financial institution at which the financial account associated with the sending user is established, whether the financial account associated with the sending user includes sufficient funds to pay the amount of money payable to the receiving user;

validating, by the financial institution, the presence of sufficient funds in the financial account to cover the monetary amount input by the sending user when sufficient funds to pay the amount of money payable to the receiving user are determined to be present in the financial account associated with the sending user;

storing, upon validation of sufficient funds to pay the amount of money payable to the receiving user, the sending user information, the delivery information, the specific financial instrument selected by the sending user, and the validated monetary amount in a storage medium of the secure self-mailing instrument payment and fund transfer cloud server;

submitting, by the secure self-mailing instrument payment and fund transfer cloud server, the sending user information, the delivery information, the specific financial instrument selected by the sending user, and the validated monetary amount stored in the storage medium of the secure self-mailing instrument payment and fund transfer cloud server to a central processor at a data center separate from the financial institution for remote printing, processing, folding and sealing, delivering to the destination associated with the receiving user, and tracking of the secure self-mailing financial instrument, wherein the secure self-mailing instrument payment and fund transfer cloud server provides a data center administration interface in the website for a person at the data center to access, over private encrypted cloud connection, the received sending user information input and selection of the specific financial instrument via the secure self-mailing financial instrument preparation, mailing, and processing application service, wherein the central processor at the data center comprises a computing device that is separate from the server at the financial institution and connects to the secure self-mailing financial instrument preparation, mailing, and processing application service via private encrypted cloud connection, wherein the person at the data center interacts with the data center administration interface of the website to access the sending user information, the delivery information, the specific financial instrument selected by the sending user, and the validated monetary amount, wherein the data center provides a mail delivery service comprising a tracking and delivery security service that confirms, by private encrypted cloud connection to the server at the financial institution, that the validated monetary amount accurately reflects the presence of sufficient funds in the financial account, tracks delivery of the secure self-mailing financial instrument to the destination associated with the receiving user, provides tracking information to the sending user by delivering the tracking information to the return address input by the sending user into the UI of the website, and stores the tracking information in a tracking and security database that is communicably connected to the secure self-mailing instrument payment and fund transfer cloud server;

printing, by the data center and in the user information viewing window of a document that conforms to the specific configuration of the secure self-mailing financial instrument, the sending user information input by the sending user;

printing, by the data center and in the delivery information section of the central flap of the document that conforms to the specific configuration of the secure self-mailing financial instrument, the delivery information input by the sending user;

printing, by the data center and in the document section of the upper flap of the document that conforms to the specific configuration of the secure self-mailing financial instrument, the specific financial instrument selected by the sending user in the UI of the website and the validated monetary amount confirmed by the data center;

folding and sealing the document, after printing and by the person at the data center, as a printed document that conforms to the specific configuration of the secure self-mailing financial instrument;

delivering, by the person at the data center, the printed document to the mail delivery service of the data center;

processing shipment of and sending out, by the mail delivery service of the data center, the printed document that conforms to the specific configuration of the secure self-mailing financial instrument, after the printed document is delivered to the mail delivery service by the person at the data center;

delivering, by the mail delivery service and to the receiving user at the destination, the printed document that conforms to the specific configuration of the secure self-mailing financial instrument, wherein the printed document that conforms to the specific configuration of the secure self-mailing financial instrument is payable only to the receiving user at the destination;

tracking delivery of the printed document that conforms to the specific configuration of the secure self-mailing financial instrument, by the tracking and delivery security service of the mail delivery service, to the receiving user at the destination; and storing, by the tracking and delivery security service of the mail delivery service in connection with the data center, the tracking information in the tracking and security database, wherein the tracking information is sent to the sending user when the receiving user at the destination receives the printed document, wherein the amount of money payable to the receiving user is automatically withdrawn from the financial account upon delivery to the receiving user.

2. The non-transitory computer readable medium of claim 1, wherein the website supports and enables web forms as a way to receive input from the sending user.

3. The non-transitory computer readable medium of claim 1, wherein the receiving user comprises one of a designee and a payee.

4. The non-transitory computer readable medium of claim 1, wherein the specific financial instrument selected by the sending user in the UI of the website and printed in the document section of the printed document that conforms to the specific configuration of the secure self-mailing financial instrument comprises print outs of the validated monetary amount, a name of the receiving user, and the specific financial account number of the financial account associated with the sending user as a payor of the monetary amount.

* * * * *